UNITED STATES PATENT OFFICE.

WERNER V. BOLTON, OF CHARLOTTENBURG, GERMANY, ASSIGNOR TO SIEMENS & HALSKE AKTIENGESELLSCHAFT, OF BERLIN, GERMANY.

INCANDESCENT BODY FOR ELECTRIC GLOW-LAMP.

No. 915,657.   Specification of Letters Patent.   Patented March 16, 1909.

Original application filed May 31, 1902, Serial No. 109,792. Divided and this application filed July 10, 1905. Serial No. 269,033.

*To all whom it may concern:*

Be it known that I, WERNER VON BOLTON, chemist, a subject of the Russian Emperor, residing at 10 Am Lützow, Charlottenburg, near Berlin, Germany, have invented certain new and useful Improvements in Incandescent Bodies for Electric Glow-Lamps; and I do hereby declare the following to be a full, clear, and exact description of the invention, such as will enable others skilled in the art to which it appertains to make and use the same.

My invention relates to improvements in incandescing bodies for electric glow-lamps.

The object of the invention is to provide an incandescing body which will have sufficient mechanical strength and electrical conductivity to insure a life of the glow-lamp of sufficient duration to meet commercial demands.

The invention which forms the subject-matter of this application is an incandescing body consisting of a substantially homogeneous intimately commingled mixture of carbid of the vanadium group with a metal whose melting point is above 2000° C., such, for example, as a metal of said vanadium group having such a high melting point.

According to my present invention I mix a finely divided metal of the vanadium group having a melting point above 2000° C with a carbid of a metal or with carbids of metals of the vanadium group, to form an intimately commingled, substantially homogeneous mixture. Or I may mix such metal with such a quantity of a suitable binding substance, for example, caoutchouc, that the amount of carbon in the mass is sufficient to convert a part, but not all of the metal, into carbid. The material thus obtained by mixing metal and binding substance is heated in an inert environment, as for example, in a vacuum, until the materials are fritted to a substantially homogeneous coherent mass of intimately commingled metal and carbid.

In carrying out my invention I may proceed as follows: I start with the amorphous powder of the desired metal, for example, tantalum, and by mixing this amorphous powder with a suitable binding substance, such as caoutchouc, which can be carbonized by heating, I form a plastic mass, which is then given the desired shape. The raw body thus obtained may have its ends attached to the terminals of an electric circuit and is then heated to a high temperature in an inert environment, for example, in a vacuum, whereby the binding substance is carbonized and the carbon unites with a part of the metal or metals to convert the same into carbid of such metal or metals, a portion of such metal or metals remaining uncombined in the metallic state and intimately commingled with such carbid, the resultant product being a substantially homogeneous incandescent body containing a metal of the vanadium group whose melting point is over 2000° C., and a carbid of a metal of such group.

The most advantageous form of my invention is a substantially homogeneous incandescent body of intimately commingled metallic tantalum and tantalum carbid, which may be made as above described.

Having thus fully described my invention, what I claim is:—

1. An incandescing body for electric glow lamps, consisting of a substantially homogeneous mass containing metallic tantalum intimately commingled with a carbid of metal of the vanadium group.

2. An incandescing body for electric glow lamps, consisting of a substantially homogeneous mixture of metallic tantalum, intimately commingled with a carbid of metal of the vanadium group.

3. An incandescing body for electric glow lamps, consisting of a substantially homogeneous mixture of metallic tantalum intimately commingled with carbid of tantalum.

In testimony whereof I hereunto affix my signature in the presence of two witnesses.

WERNER V. BOLTON.

Witnesses:
 WOLDEMAR HAUPT,
 HENRY HASPER.